(12) United States Patent
Hareuveni et al.

(10) Patent No.: US 12,167,345 B2
(45) Date of Patent: Dec. 10, 2024

(54) PERFORMANCE AND RANGE OF INDOOR CLIENT DEVICES BY APPLYING REGULATED EIRP LIMITS OF SUBORDINATE DEVICES

(71) Applicant: Intel Corporation, Santa Clara, CA (US)

(72) Inventors: Ofer Hareuveni, Haifa (IL); Ehud Reshef, Qiryat Tivon (IL)

(73) Assignee: Intel Corporation, Santa Clara, CA (US)

( * ) Notice: Subject to any disclaimer, the term of this patent is extended or adjusted under 35 U.S.C. 154(b) by 660 days.

(21) Appl. No.: 17/353,528

(22) Filed: Jun. 21, 2021

(65) Prior Publication Data

US 2022/0408374 A1 Dec. 22, 2022

(51) Int. Cl.
*H04W 88/10* (2009.01)
*H04W 52/34* (2009.01)
*H04W 52/36* (2009.01)

(52) U.S. Cl.
CPC ....... *H04W 52/346* (2013.01); *H04W 52/365* (2013.01); *H04W 88/10* (2013.01)

(58) Field of Classification Search
CPC .. H04W 52/346; H04W 52/365; H04W 88/10
See application file for complete search history.

(56) References Cited

U.S. PATENT DOCUMENTS

| 10,746,844 | B2 * | 8/2020 | Chuo | H04L 5/143 |
| 11,350,424 | B2 * | 5/2022 | Macmullan | H04W 72/541 |
| 11,882,585 | B2 * | 1/2024 | Macmullan | H04W 16/14 |
| 2020/0116817 | A1 * | 4/2020 | Chuo | H04L 27/2627 |
| 2021/0037479 | A1 * | 2/2021 | Akkarakaran | H04W 52/383 |
| 2021/0144724 | A1 * | 5/2021 | Macmullan | H04W 16/14 |
| 2021/0385865 | A1 * | 12/2021 | Mueck | H04W 80/02 |
| 2022/0052809 | A1 * | 2/2022 | Liu | H04L 5/0057 |
| 2022/0256547 | A1 * | 8/2022 | Macmullan | H04W 72/0453 |
| 2023/0055366 | A1 * | 2/2023 | Lunttila | H04W 72/21 |

FOREIGN PATENT DOCUMENTS

WO WO-2021091873 A1 * 5/2021 ............ H04W 16/14

OTHER PUBLICATIONS

IEEE Std 802.11ax-2021; "IEEE Standard for Information Technology; Telecommunications and Information Exchange between Systems Local and Metropolitan Area Networks; Specific Requirements; Part 11: Wireless LAN Medium Access Control (MAC) and Physical Layer (PHY) Specifications; Amendment 1: Enhancements for High-Efficiency WLAN," 767 pages.

* cited by examiner

*Primary Examiner* — Hai V Nguyen

(74) *Attorney, Agent, or Firm* — Schwabe, Williamson & Wyatt, P.C.

(57) ABSTRACT

Embodiments of the present disclosure are directed to applying the higher effective isotropic radiated power (EIRP) limits that are set to subordinate devices to client devices that meet indoor constrains to form their own networks concurrently to operate as a client under the control of indoor access point (AP). Other embodiments may be described and claimed.

17 Claims, 7 Drawing Sheets

500

Retrieving, from memory, parameters for forming a network with a wireless fidelity (Wi-Fi) device operating in a 5.925-7.125 GHz band
505

Forming a network with the Wi-Fi device based on the retrieved parameters while the apparatus concurrently operates as a client under control of an indoor access point (AP)
510

Communicating with the indoor AP using an effective isotropic radiated power (EIRP) in excess of 6 dB below an EIRP limit for total power and spectral power density (PD) associated with the indoor AP
515

Forming a network with a wireless fidelity (Wi-Fi) device while a client device concurrently operates as a client under control of an indoor access point (AP)
605

Communicating with the indoor AP using an effective isotropic radiated power (EIRP) in excess of 6 dB below an EIRP limit for total power and spectral power density (PD) associated with the indoor AP
610

Determining that a client device has a capability to form a network with a wireless fidelity (Wi-Fi) device while the client device concurrently operates as a client under control of an indoor access point (AP)
705

In response to determining that the client device has the capability, communicating with the indoor AP using an effective isotropic radiated power (EIRP) in excess of 6 dB below an EIRP limit for total power and spectral power density (PD) associated with the indoor AP
710

Figure 7

PERFORMANCE AND RANGE OF INDOOR CLIENT DEVICES BY APPLYING REGULATED EIRP LIMITS OF SUBORDINATE DEVICES

FIELD

Various embodiments generally may relate to the field of wireless communications.

BACKGROUND

Regulatory agencies and standards bodies, including Federal Communications Commission (FCC) and the European Telecommunications Standardization Institute (ETSI) are in the process of allowing unlicensed use in the 5.925-7.125 GHz frequency band (also referred to as the 6 GHz or ultra-high band (UHB) band). With the availability of the 6 GHz band, the available spectrum for Wi-Fi use may be approximately doubled relative to the existing spectrum for unlicensed use in the 2.4 GHz and 5 GHz bands. The additional spectrum may provide opportunities for a multi-radio IEEE 802.11 apparatus to perform concurrent operations, such as communication, ranging, and/or environment sensing operations. However, providing concurrent multi-radio operation is difficult, e.g., due to multiple sets of constraints, such as regulatory limitations, spectrum sharing with other technologies, radio design, and/or adjacent channel interference. Embodiments of the present disclosure address these and other issues.

BRIEF DESCRIPTION OF THE DRAWINGS

Embodiments will be readily understood by the following detailed description in conjunction with the accompanying drawings. To facilitate this description, like reference numerals designate like structural elements. Embodiments are illustrated by way of example and not by way of limitation in the figures of the accompanying drawings.

FIGS. 5, 6 and 7 illustrate examples of operation flow/algorithmic structures in accordance with some embodiments.

DETAILED DESCRIPTION

Figure 1:
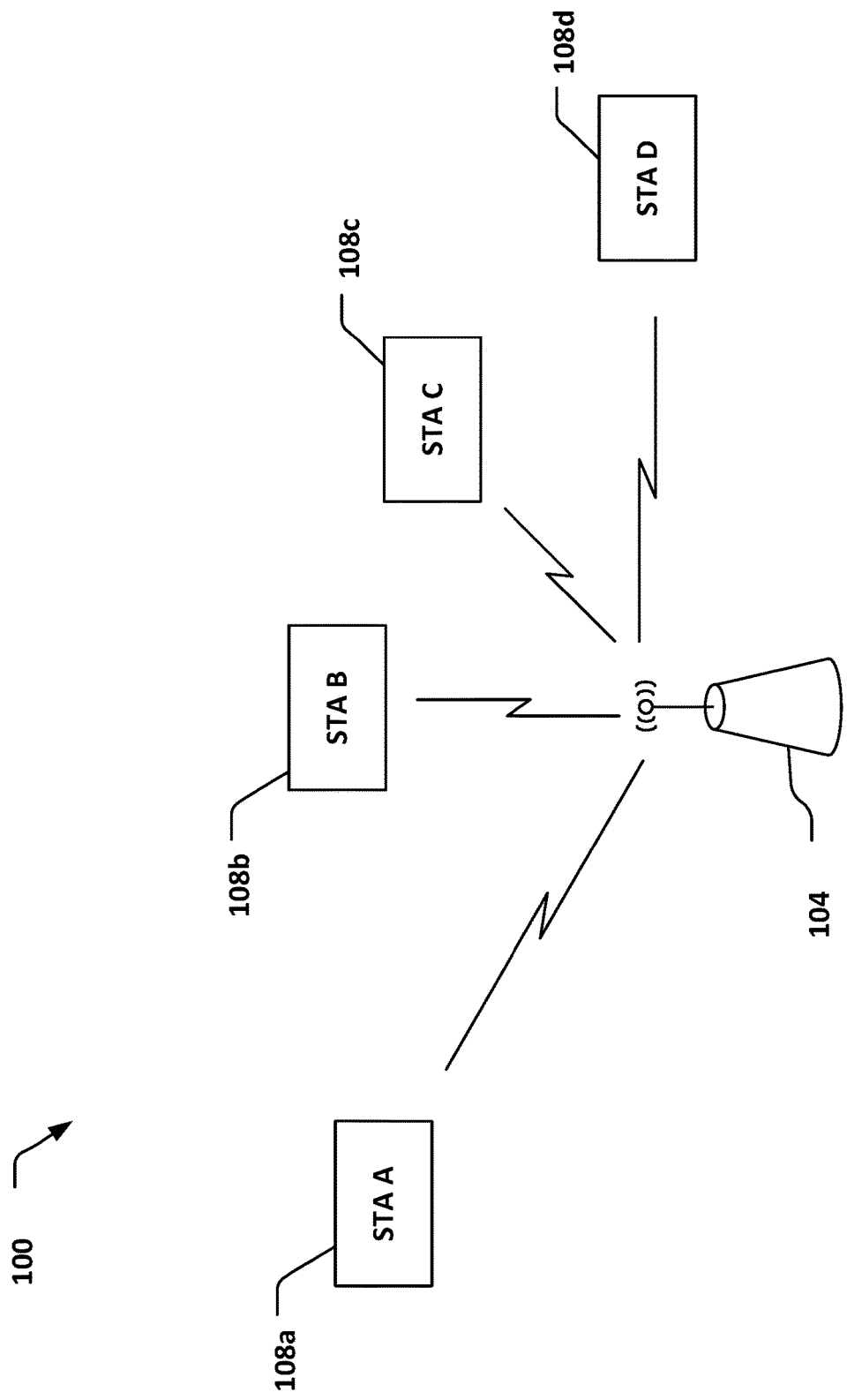
FIG. 1 illustrates a network in accordance with some embodiments.

The following detailed description refers to the accompanying drawings. The same reference numbers may be used in different drawings to identify the same or similar elements. In the following description, for purposes of explanation and not limitation, specific details are set forth such as particular structures, architectures, interfaces, techniques, etc. in order to provide a thorough understanding of the various aspects of various embodiments. However, it will be apparent to those skilled in the art having the benefit of the present disclosure that the various aspects of the various embodiments may be practiced in other examples that depart from these specific details. In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

In certain instances, descriptions of well-known devices, circuits, and methods are omitted so as not to obscure the description of the various embodiments with unnecessary detail. For the purposes of the present document, the phrases "A or B" and "A/B" mean (A), (B), or (A and B).

As used herein, the term "circuitry" may refer to, is part of, or includes hardware components such as an electronic circuit, a logic circuit, a processor (shared, dedicated, or group) and/or memory (shared, dedicated, or group), an Application Specific Integrated Circuit (ASIC), a field-programmable device (FPD) (e.g., a field-programmable gate array (FPGA), a programmable logic device (PLD), a complex PLD (CPLD), a high-capacity PLD (HCPLD), a structured ASIC, or a programmable System-on-Chip (SoC)), digital signal processors (DSPs), etc., that are configured to provide the described functionality. In some embodiments, the circuitry may execute one or more software or firmware programs to provide at least some of the described functionality. In addition, the term "circuitry" may also refer to a combination of one or more hardware elements (or a combination of circuits used in an electrical or electronic system) with the program code used to carry out the functionality of that program code. In these embodiments, the combination of hardware elements and program code may be referred to as a particular type of circuitry.

As described with reference to various embodiments herein, by enabling client devices that meet indoor constrains to form its own network concurrently to operating as a client under the control of indoor access point (AP), such clients should apply the higher effective isotropic radiated power (EIRP) limits that are set to subordinate devices, getting further better performance over range relative to client devices that are not capable of forming a network. The higher limits should apply regardless of actual activation of a device own network.

Previous solutions applied client EIRP limitations to any client operating under the control of Indoor access point, regardless of its capabilities to form its own network. However, regulatory rules for client devices operating under the control of indoor Access Point at 5925-7250 MHz band, limited the client EIRP to be 6 dBm below the limits of Indoor AP or subordinate device, causing significant loss of link budget. Range and throughput over range. It should be noted that these rules refer to the FCC, however in other jurisdictions (e.g., ETSI) the rules may be different.

In embodiments of the present disclosure, by contrast, by adding software (SW) and/or hardware (HW) capabilities of forming its own wireless local area network (LAN) or peer2peer network to a Wi-Fi device operating indoors in 5.925-7.125 GHz band as a client device (STA-CFON), its operation as a client devices can achieve much better performance over range by allowing higher EIRP limits of +6 dBm in max Tx power and spectral power density (PD) relative to an indoor client, device that is not capable of forming its own network, or a mobile device that is not designed for indoor use only.

Additionally, by applying such CFON capabilities, any desktop personal computer (PC), Internet-of-Things (IOT) device, All-in-one computer, mini desktop (e.g. next unit of computing (NUC) or PC on key) should allow much better performance in the 5.925-7.125 GHz band, relative to what it could achieve without being capable of concurrently forming its own network (STA-CFON).

In FCC e-CFR Title 47, Part 15, Subpart E, Dated Mar. 25, 2021, regulations were set for "unlicensed National Information Infrastructure (U-NII) devices operating in the 5.15-5.35 GHz, 5.47-5.725 GHz, 5.725-5.85 GHz, and 5.925-7.125 GHz bands" Similar rules are being defined in other countries. The FCC defined in 15.403 three types of devices that apply indoor use, as described below.

Indoor Access Point. For the purpose of this subpart, an access point that operates in the 5.925-7.125 GHz band, is supplied power from a wired connection, has an integrated antenna, is not battery powered, and does not have a weatherized enclosure.

Subordinate Device. For the purpose of this subpart, a device that operates in the 5.925-7.125 GHz band under the control of an Indoor Access Point, is supplied power from a wired connection, has an integrated antenna, is not battery powered, does not have a weatherized enclosure, and does not have a direct connection to the internet. Subordinate devices must not be used to connect devices between separate buildings or structures. Subordinate devices must be authorized under certification procedures in part 2 of this chapter. Modules may not be certified as subordinate devices.

Client Device. A U-NII device whose transmissions are generally under the control of an access point and is not capable of initiating a network The EIRP power density limits set by FCC are as follows:

For an indoor access point operating in the 5.925-7.125 GHz band, the maximum power spectral density must not exceed 5 dBm e.i.r.p. in any 1-megahertz band. In addition, the maximum e.i.r.p. over the frequency band of operation must not exceed 30 dBm.

For a subordinate device operating under the control of an indoor access point in the 5.925-7.125 GHz band, the maximum power spectral density must not exceed 5 dBm e.i.r.p in any 1-megahertz band, and the maximum e.i.r.p. over the frequency band of operation must not exceed 30 dBm.

For client devices operating under the control of an indoor access point in the 5.925-7.125 GHz bands, the maximum power spectral density must not exceed −1 dBm e.i.r.p. in any 1-megahertz band, and the maximum e.i.r.p. over the frequency band of operation must not exceed 24 dBm.

However, the FCC did not apply distinguished rules to client devices operating under the control of an indoor access point, and to client devices that meet Indoor client requirements.

FCC Defined Indoor Devices

The FCC also defined "fixed client devices": Fixed client device. For the purpose of this subpart, a client device intended as customer premise equipment that is permanently attached to a structure, operates only on channels provided by an AFC, has a geolocation capability, and complies with antenna pointing angle requirements. This type of devices is out of scope of this IDF.

Wi-Fi Alliance defined a subset of client devices that are capable of forming their own network. Source: Optimized Connectivity Experience (OCE) Technical Specification, Version 1.1

STA-CFON: STA capable of forming its own network.

OCE STA-CFON: An OCE STA that is also capable of forming its own network but is not an OCE AP, and does not support all the required features for an OCE AP. In addition to operating as an OCE STA, an OCE STA-CFON is capable of operating in a mode where it transmits Beacon frames similar to a mobile AP or a Managed Wi-Fi Direct GO.

In accordance with embodiments of the present disclosure, any device that is "operating under the control of an indoor access point in the 5.925-7.125 GHz bands", capable of forming its own network (STA-CFON), and meets the definition of Indoor device, meaning "is supplied power from a wired connection, has an integrated antenna, is not battery powered, and does not have a weatherized enclosure" should be subject to the highest levels of emission between EIRP limitations of "Subordinate Devices" and the limits of "Client device under the control of an Indoor access point."

For example, in some embodiments indoor client devices operating at band 5925-7250 MHz band can be categorized as sub-ordinate devices and be subject the EIRP limitations of such devices.

In some embodiments, any Indoor client that has the HW and SW capabilities to form its own wireless network in concurrent to operation as a client under the control of an AP (CFON) should either be categorized as a client device or subordinate device.

In some embodiments, the regulatory rules apply to such indoor client device should not change based on actual activation of the capability of the device to form its own network.

In some embodiments, the regulatory rules apply to such indoor client device should not change based on activation of the capability of the device to form its own network, on the same frequency of its connection to AP or on a different channel or channel bandwidth.

In some embodiments, the above is not limited to CFON using IEEE 802.11 based network (Wi-Fi) or any other type of unlicensed spectrum implementation.

Systems and Implementations

FIGS. 1-4 illustrate various systems, devices, and components that may implement aspects of disclosed embodiments.

FIG. 1 illustrates a network 100 in accordance with some embodiments. The network 100 may include an access point (AP) 104 communicatively coupled with a plurality of STAs including, for example, STA A 108a, STA B 108b, STA C 108c, and STA D 108d (collectively referred to as STAs 108a-d). The network 100 may be a wireless local area network (WLAN) that is compatible with IEEE 802.11 protocols. In some embodiments, the network 100 may also be referred to as a basic service set (BSS). In some embodiments, the STAs 108a-d may additionally or alternatively communicate with one another, e.g., via peer-to-peer (P2P) communication.

In various embodiments, the individual STAs 108a-d may include a plurality of virtual medium access control layers (vMACs) associated with separate medium access control (MAC) addresses. The vMACs may include an allocation of MAC resources of the STA 108a-d, e.g., from a pool of MAC resources that implements a MAC layer of the STA 108a-c. For example, the MAC resources may include one or more queues, first-in-first-outs (FIFOs), counters, direct memory access (DMA) circuitry, timers, static and/or dynamic memory, firmware, processor circuitry, and/or other resources. In various embodiments, the vMACs may be implemented in a baseband circuitry of the STA 108a-c.

The individual STAs 108a-d may further include a plurality of virtual physical layers (vPHYs). The vPHYs may include an allocation of PHY resources of the STA 108a-d, e.g., from a pool of PHY resources of the STA 108a-d. For example, the PHY resources may include one or more energy and preamble detectors, analog-to-digital converters (ADCs), digital-to-analog converters (DACs), signal processors, firmware, static memories, buffers, Fast Fourier transform circuitry, error correction coding and/or decoding circuits, channel estimation processors, accurate timing measurement circuitry, and/or other resources. In embodiments, the vPHYs may be implemented in the baseband circuitry of the STA 108a-c.

In various embodiments, the STAs 108a-d may further include a plurality of radio circuits. The radio circuits may include one or more transmitters and/or receivers. The transmitters and/or receivers may include circuitry to convert signals between baseband and radio frequency (RF). For example, the transmitters may receive baseband signals from the vPHYs and convert the baseband signals to RF signals for transmission via one or more antennas of the STA 108a-d. The receivers may receive RF signals from the one or more antennas and convert the RF signals to baseband signals (e.g., to be processed by the vPHYs and/or vMACs). In some embodiments in which the radio circuit includes both transmit and receive functionality (e.g., a transceiver), the transmit and receive circuits may share one or more components.

In embodiments, the radio circuits may include one or more RF front end components, such as one or more mixers (e.g., phase-locked loop (PLL) mixers), RF switches, filters, diplexers, amplifiers (e.g., low noise amplifiers (LNAs) and/or power amplifiers), adaptive gain control (AGC) circuitry, and/or other components.

In various embodiments, the vPHYs and/or radio circuits may be allocated to respective vMACs, The vMACs may be used to perform different WLAN operations for the STA 108a-d. Accordingly, the vMACs and associated vPHYs and radio circuits may enable concurrent operation of multiple WLAN operations by the STA 108a-d. In embodiments, external devices may view the different vMACs and associated vPHYs as separate devices for purposes of the WLAN operations.

Figure 2:
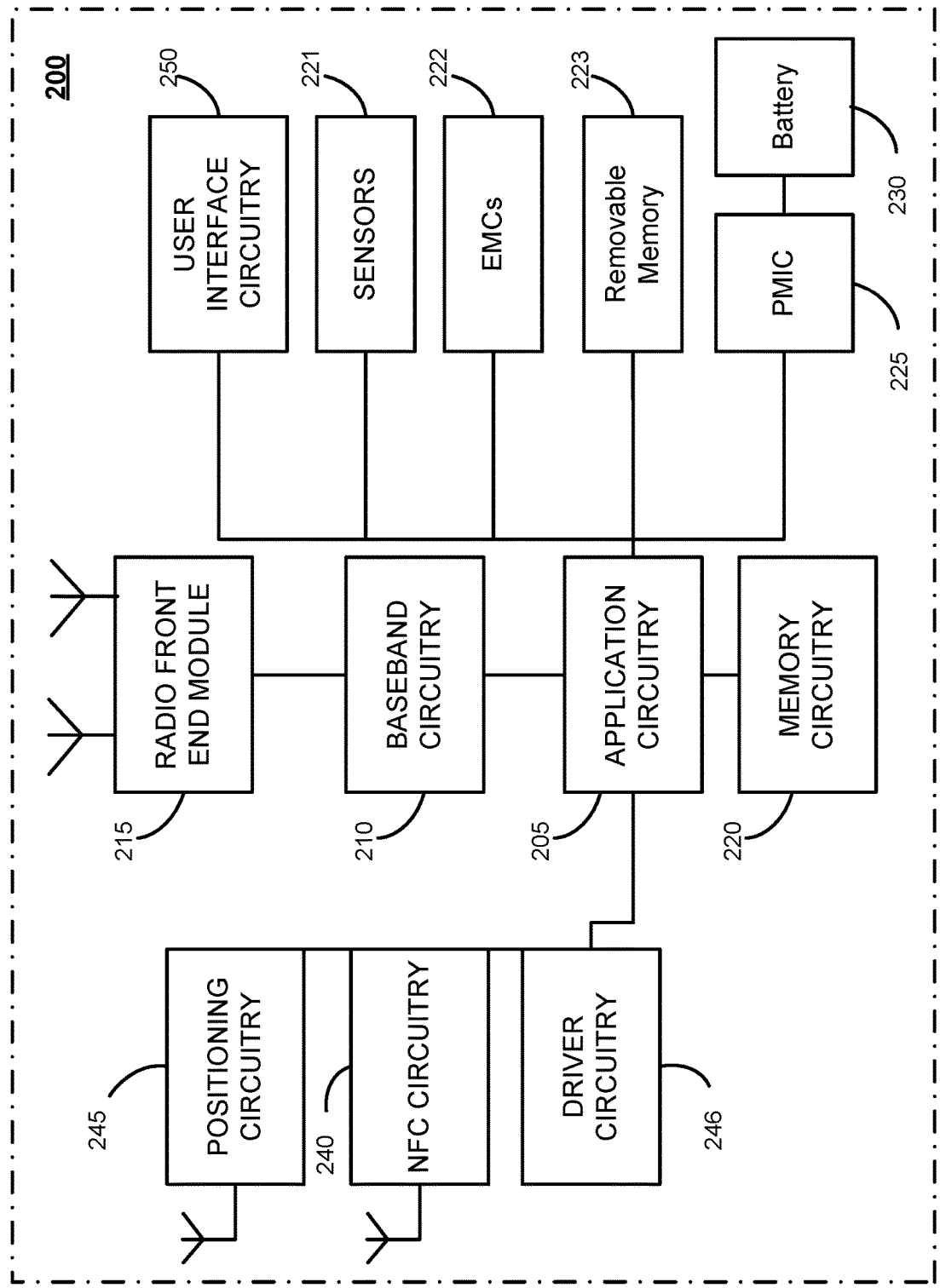
FIG. 2 illustrates an example communication device (e.g., station (STA)) in accordance with various embodiments.

FIG. 2 illustrates an example of a platform 200 (or "device 200") in accordance with various embodiments. The platform 200 may correspond to the multi-radio wireless station described herein, e.g., STA 100 and/or 200.

The platform 200 may include any combinations of the components shown in the example. The components of platform 200 may be implemented as integrated circuits (ICs), portions thereof, discrete electronic devices, or other modules, logic, hardware, software, firmware, or a combination thereof adapted in the computer platform 200, or as components otherwise incorporated within a chassis of a larger system. The block diagram of FIG. 2 is intended to show a high level view of components of the computer platform 200. However, some of the components shown may be omitted, additional components may be present, and different arrangement of the components shown may occur in other implementations.

Application circuitry 205 includes circuitry such as, but not limited to one or more processors (or processor cores), cache memory, and one or more of LDOs, interrupt controllers, serial interfaces such as SPI, I2C or universal programmable serial interface module, RTC, timer-counters including interval and watchdog timers, general purpose I/O, memory card controllers such as SD MMC or similar, USB interfaces, MIPI interfaces, and JTAG test access ports. The processors (or cores) of the application circuitry 205 may be coupled with or may include memory/storage elements and may be configured to execute instructions stored in the memory/storage to enable various applications or operating systems to run on the system 200. In some implementations, the memory/storage elements may be on-chip memory circuitry, which may include any suitable volatile and/or non-volatile memory, such as DRAM, SRAM, EPROM, EEPROM, Flash memory, solid-state memory, and/or any other type of memory device technology, such as those discussed herein.

The processor(s) of application circuitry 205 may include, for example, one or more processor cores, one or more application processors, one or more GPUs, one or more RISC processors, one or more ARM processors, one or more CISC processors, one or more DSP, one or more FPGAs, one or more PLDs, one or more ASICs, one or more microprocessors or controllers, a multithreaded processor, an ultra-low voltage processor, an embedded processor, some other known processing element, or any suitable combination thereof. In some embodiments, the application circuitry 205 may comprise, or may be, a special-purpose processor/controller to operate according to the various embodiments herein.

As examples, the processor(s) of application circuitry 205 may include an Intel® Architecture Core™ based processor, such as a Quark™, an Atom™, an i3, an i5, an i7, or an MCU-class processor, or another such processor available from Intel® Corporation, Santa Clara, CA. The processors of the application circuitry 205 may also be one or more of Advanced Micro Devices (AMD) Ryzen® processor(s) or Accelerated Processing Units (APUs); A5-A9 processor(s) from Apple® Inc., Snapdragon™ processor(s) from Qualcomm® Technologies, Inc., Texas Instruments, Inc.® Open Multimedia Applications Platform (OMAP)™ processor(s); a MIPS-based design from MIPS Technologies, Inc. such as MIPS Warrior M-class, Warrior I-class, and Warrior P-class processors; an ARM-based design licensed from ARM Holdings, Ltd., such as the ARM Cortex-A, Cortex-R, and Cortex-M family of processors; or the like. In some implementations, the application circuitry 205 may be a part of a system on a chip (SoC) in which the application circuitry 205 and other components are formed into a single integrated circuit, or a single package, such as the Edison™ or Galileo™ SoC boards from Intel® Corporation.

Additionally or alternatively, application circuitry 205 may include circuitry such as, but not limited to, one or more a field-programmable devices (FPDs) such as FPGAs and the like; programmable logic devices (PLDs) such as complex PLDs (CPLDs), high-capacity PLDs (HCPLDs), and the like; ASICs such as structured ASICs and the like; programmable SoCs (PSoCs); and the like. In such embodiments, the circuitry of application circuitry 205 may comprise logic blocks or logic fabric, and other interconnected resources that may be programmed to perform various functions, such as the procedures, methods, functions, etc. of the various embodiments discussed herein. In such embodiments, the circuitry of application circuitry 205 may include memory cells (e.g., erasable programmable read-only memory (EPROM), electrically erasable programmable read-only memory (EEPROM), flash memory, static memory (e.g., static random access memory (SRAM), anti-fuses, etc.)) used to store logic blocks, logic fabric, data, etc. in look-up tables (LUTs) and the like.

The baseband circuitry 210 may be implemented, for example, as a solder-down substrate including one or more integrated circuits, a single packaged integrated circuit soldered to a main circuit board or a multi-chip module containing two or more integrated circuits. In various embodiments, the baseband circuitry 210 may implement the vMACs and/or vPHYs described herein. Additionally, the baseband circuitry 210 may determine the allocations of radios and/or vPHYs to vMACs as described herein. The various hardware electronic elements of baseband circuitry 210 are discussed infra with regard to FIG. 3.

The one or more RFEMs 215 may include one or more radio frequency integrated circuits (RFICs). The RFICs may include connections to one or more antennas or antenna arrays, and the RFEM may be connected to multiple antennas. In embodiments, the RFEMs 215 may implement the radio circuits described herein, which may be dynamically allocated to respective vMACs. The various hardware electronic elements of RFEMs 215 are discussed infra with regard to FIG. 3.

The memory circuitry 220 may include any number and type of memory devices used to provide for a given amount of system memory. As examples, the memory circuitry 220 may include one or more of volatile memory including random access memory (RAM), dynamic RAM (DRAM) and/or synchronous dynamic RAM (SDRAM), and nonvolatile memory (NVM) including high-speed electrically erasable memory (commonly referred to as Flash memory), phase change random access memory (PRAM), magnetoresistive random access memory (MRAM), etc. The memory circuitry 220 may be developed in accordance with a Joint Electron Devices Engineering Council (JEDEC) low power double data rate (LPDDR)-based design, such as LPDDR2, LPDDR3, LPDDR4, or the like. Memory circuitry 220 may be implemented as one or more of solder down packaged integrated circuits, single die package (SDP), dual die package (DDP) or quad die package (Q17P), socketed memory modules, dual inline memory modules (DIMMs) including microDIMMs or MiniDIMMs, and/or soldered onto a motherboard via a ball grid array (BGA). In low power implementations, the memory circuitry 220 may be on-die memory or registers associated with the application circuitry 205. To provide for persistent storage of information such as data, applications, operating systems and so forth, memory circuitry 220 may include one or more mass storage devices, which may include, inter alia, a solid state disk drive (SSDD), hard disk drive (HDD), a micro HDD, resistance change memories, phase change memories, holographic memories, or chemical memories, among others. For example, the computer platform 200 may incorporate the three-dimensional (3D) cross-point (XPOINT) memories from Intel® and Micron®.

Removable memory circuitry 223 may include devices, circuitry, enclosures/housings, ports or receptacles, etc. used to couple portable data storage devices with the platform 200. These portable data storage devices may be used for mass storage purposes, and may include, for example, flash memory cards (e.g., Secure Digital (SD) cards, microSD cards, xD picture cards, and the like), and USB flash drives, optical discs, external HDDs, and the like.

The platform 200 may also include interface circuitry (not shown) that is used to connect external devices with the platform 200. The external devices connected to the platform 200 via the interface circuitry include sensor circuitry 221 and electro-mechanical components (EMCs) 222, as well as removable memory devices coupled to removable memory circuitry 223.

The sensor circuitry 221 include devices, modules, or subsystems whose purpose is to detect events or changes in its environment and send the information (sensor data) about the detected events to some other a device, module, subsystem, etc. Examples of such sensors include, inter alia, inertia measurement units (IMUs) comprising accelerometers, gyroscopes, and/or magnetometers; microelectromechanical systems (MEMS) or nanoelectromechanical systems (NEMS) comprising 3-axis accelerometers, 3-axis gyroscopes, and/or magnetometers; level sensors; flow sensors; temperature sensors (e.g., thermistors); pressure sensors; barometric pressure sensors; gravimeters; altimeters; image capture devices (e.g., cameras or lensless apertures); light detection and ranging (LiDAR) sensors; proximity sensors (e.g., infrared radiation detector and the like), depth sensors, ambient light sensors, ultrasonic transceivers; microphones or other like audio capture devices; etc.

EMCs 222 include devices, modules, or subsystems whose purpose is to enable platform 200 to change its state, position, and/or orientation, or move or control a mechanism or (sub)system. Additionally, EMCs 222 may be configured to generate and send messages/signalling to other components of the platform 200 to indicate a current state of the EMCs 222. Examples of the EMCs 222 include one or more power switches, relays including electromechanical relays (EMRs) and/or solid state relays (SSRs), actuators (e.g., valve actuators, etc.), an audible sound generator, a visual warning device, motors (e.g., DC motors, stepper motors, etc.), wheels, thrusters, propellers, claws, clamps, hooks, and/or other like electro-mechanical components. In embodiments, platform 200 is configured to operate one or more EMCs 222 based on one or more captured events and/or instructions or control signals received from a service provider and/or various clients.

In some implementations, the interface circuitry may connect the platform 200 with positioning circuitry 245. The positioning circuitry 245 includes circuitry to receive and decode signals transmitted/broadcasted by a positioning network of a GNSS. Examples of navigation satellite constellations (or GNSS) include United States' GPS, Russia's GLONASS, the European Union's Galileo system, China's BeiDou Navigation Satellite System, a regional navigation system or GNSS augmentation system (e.g., NAVIC), Japan's QZSS, France's DORIS, etc.), or the like. The positioning circuitry 245 comprises various hardware elements (e.g., including hardware devices such as switches, filters, amplifiers, antenna elements, and the like to facilitate OTA communications) to communicate with components of a positioning network, such as navigation satellite constellation nodes. In some embodiments, the positioning circuitry 245 may include a Micro-PNT IC that uses a master timing clock to perform position tracking/estimation without GNSS assistance. The positioning circuitry 245 may also be part of, or interact with, the baseband circuitry 210 and/or RFEMs 215 to communicate with the nodes and components of the positioning network. The positioning circuitry 245 may also provide position data and/or time data to the application circuitry 205, which may use the data to synchronize operations with various infrastructure (e.g., radio base stations), for turn-by-turn navigation applications, or the like In some implementations, the interface circuitry may connect the platform 200 with Near-Field Communication (NFC) circuitry 240. NFC circuitry 240 is configured to provide contactless, short-range communications based on radio frequency identification (RFID) standards, wherein magnetic field induction is used to enable communication between NFC circuitry 240 and NFC-enabled devices external to the platform 200 (e.g., an "NFC touchpoint"). NFC circuitry 240 comprises an NFC controller coupled with an antenna element and a processor coupled with the NFC controller. The NFC controller may be a chip/IC providing NFC functionalities to the NFC circuitry 240 by executing NFC controller firmware and an NFC stack. The NFC stack may be executed by the processor to control the NFC controller, and the NFC controller firmware may be executed by the NFC controller to control the antenna element to emit short-range RF signals. The RF signals may power a passive NFC tag (e.g., a microchip embedded in a sticker or wristband) to transmit stored data to the NFC circuitry 240, or initiate data transfer between the NFC circuitry 240 and another active NFC device (e.g., a smartphone or an NFC-enabled POS terminal) that is proximate to the platform 200.

The driver circuitry 246 may include software and hardware elements that operate to control particular devices that are embedded in the platform 200, attached to the platform 200, or otherwise communicatively coupled with the platform 200. The driver circuitry 246 may include individual drivers allowing other components of the platform 200 to interact with or control various input/output (I/O) devices that may be present within, or connected to, the platform 200. For example, driver circuitry 246 may include a display driver to control and allow access to a display device, a touchscreen driver to control and allow access to a touchscreen interface of the platform 200, sensor drivers to obtain sensor readings of sensor circuitry 221 and control and allow access to sensor circuitry 221, EMC drivers to obtain actuator positions of the EMCs 222 and/or control and allow access to the EMCs 222, a camera driver to control and allow access to an embedded image capture device, audio drivers to control and allow access to one or more audio devices.

The power management integrated circuitry (PMIC) 225 (also referred to as "power management circuitry 225") may manage power provided to various components of the platform 200. In particular, with respect to the baseband circuitry 210, the PMIC 225 may control power-source selection, voltage scaling, battery charging, or DC-to-DC conversion. The PMIC 225 may often be included when the platform 200 is capable of being powered by a battery 230.

A battery 230 may power the platform 200, although in some examples the platform 200 may be mounted deployed in a fixed location, and may have a power supply coupled to an electrical grid. The battery 230 may be a lithium ion battery, a metal-air battery, such as a zinc-air battery, an aluminum-air battery, a lithium-air battery, and the like. In some implementations, such as in vehicle-to-everything (V2X) applications, the battery 230 may be a typical lead-acid automotive battery.

In some implementations, the battery 230 may be a "smart battery," which includes or is coupled with a Battery Management System (BMS) or battery monitoring integrated circuitry. The BMS may be included in the platform 200 to track the state of charge (SoCh) of the battery 230. The BMS may be used to monitor other parameters of the battery 230 to provide failure predictions, such as the state of health (SoH) and the state of function (SoF) of the battery 230. The BMS may communicate the information of the battery 230 to the application circuitry 205 or other components of the platform 200. The BMS may also include an analog-to-digital (ADC) convertor that allows the application circuitry 205 to directly monitor the voltage of the battery 230 or the current flow from the battery 230. The battery parameters may be used to determine actions that the platform 200 may perform, such as transmission frequency, network operation, sensing frequency, and the like.

A power block, or other power supply coupled to an electrical grid may be coupled with the BMS to charge the battery 230. In some examples, the power block 230 may be replaced with a wireless power receiver to obtain the power wirelessly, for example, through a loop antenna in the computer platform 200. In these examples, a wireless battery charging circuit may be included in the BMS. The specific charging circuits chosen may depend on the size of the battery 230, and thus, the current required. The charging may be performed using the Airfuel standard promulgated by the Airfuel Alliance, the Qi wireless charging standard promulgated by the Wireless Power Consortium, or the Rezence charging standard promulgated by the Alliance for Wireless Power, among others.

User interface circuitry 250 includes various input/output (I/O) devices present within, or connected to, the platform 200, and includes one or more user interfaces designed to enable user interaction with the platform 200 and/or peripheral component interfaces designed to enable peripheral component interaction with the platform 200. The user interface circuitry 250 includes input device circuitry and output device circuitry. Input device circuitry includes any physical or virtual means for accepting an input including, inter alia, one or more physical or virtual buttons (e.g., a reset button), a physical keyboard, keypad, mouse, touchpad, touchscreen, microphones, scanner, headset, and/or the like. The output device circuitry includes any physical or virtual means for showing information or otherwise conveying information, such as sensor readings, actuator position (s), or other like information. Output device circuitry may include any number and/or combinations of audio or visual display, including, inter alia, one or more simple visual outputs/indicators (e.g., binary status indicators (e.g., light emitting diodes (LEDs)) and multi-character visual outputs, or more complex outputs such as display devices or touchscreens (e.g., Liquid Chrystal Displays (LCD), LED displays, quantum dot displays, projectors, etc.), with the output of characters, graphics, multimedia objects, and the like being generated or produced from the operation of the platform 200. The output device circuitry may also include speakers or other audio emitting devices, printer(s), and/or the like. In some embodiments, the sensor circuitry 221 may be used as the input device circuitry (e.g., an image capture device, motion capture device, or the like) and one or more EMCs may be used as the output device circuitry (e.g., an actuator to provide haptic feedback or the like). In another example, NFC circuitry comprising an NFC controller coupled with an antenna element and a processing device may be included to read electronic tags and/or connect with another NFC-enabled device. Peripheral component interfaces may include, but are not limited to, a non-volatile memory port, a USB port, an audio jack, a power supply interface, etc.

Although not shown, the components of platform 200 may communicate with one another using a suitable bus or interconnect (IX) technology, which may include any number of technologies, including ISA, EISA, PCI, PCIx, PCIe, a Time-Trigger Protocol (TTP) system, a FlexRay system, or any number of other technologies. The bus/IX may be a proprietary bus/IX, for example, used in a SoC based system. Other bus/IX systems may be included, such as an I2C interface, an SPI interface, point-to-point interfaces, and a power bus, among others.

Figure 3:
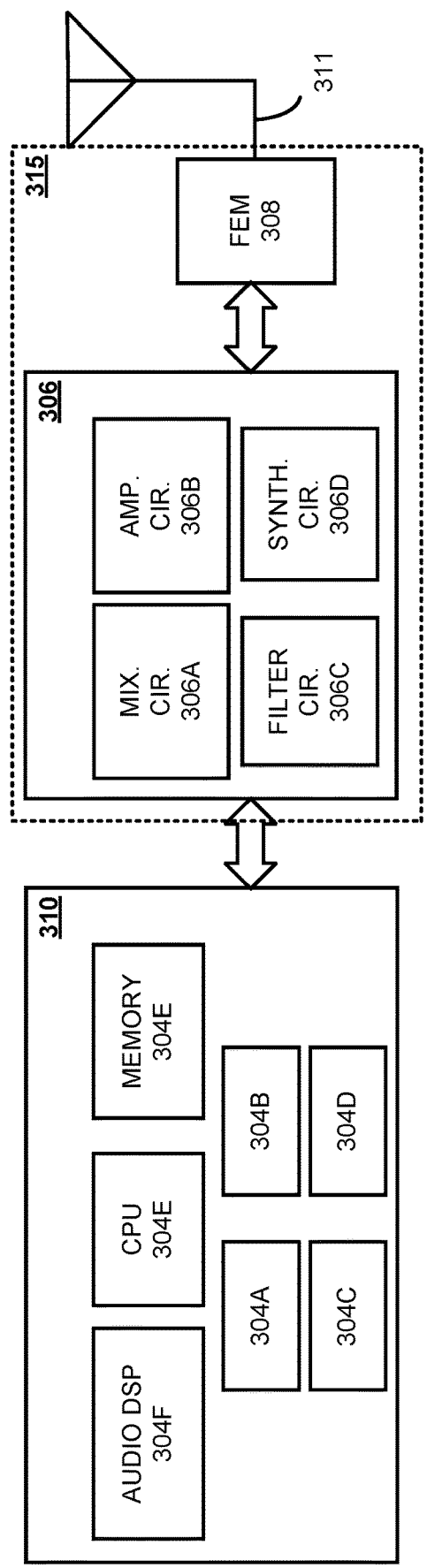
FIG. 3 illustrates example components of baseband circuitry and radio front end modules in accordance with various embodiments.

FIG. 3 illustrates example components of baseband circuitry 310 and radio front end modules (RFEM) 315 in accordance with various embodiments. The baseband circuitry 310 corresponds to the baseband circuitry 210 of FIG. 2. The RFEM 315 corresponds to the RFEM 215 of FIG. 2. As shown, the RFEMs 315 may include Radio Frequency (RF) circuitry 306, front-end module (FEM) circuitry 308, and antenna array 311 coupled together at least as shown.

The baseband circuitry 310 includes circuitry and/or control logic configured to carry out various radio/network protocol and radio control functions that enable communication with one or more radio networks via the RF circuitry 306. The radio control functions may include, but are not limited to, signal modulation/demodulation, encoding/decoding, radio frequency shifting, etc. In some embodiments, modulation/demodulation circuitry of the baseband circuitry 310 may include Fast-Fourier Transform (FFT), precoding, or constellation mapping/demapping functionality. In some embodiments, encoding/decoding circuitry of the baseband circuitry 310 may include convolution, tail-biting convolution, turbo, Viterbi, or Low Density Parity Check (LDPC) encoder/decoder functionality. Embodiments of modulation/demodulation and encoder/decoder functionality are not limited to these examples and may include other suitable functionality in other embodiments. The baseband circuitry 310 is configured to process baseband signals received from a receive signal path of the RF circuitry 306 and to generate baseband signals for a transmit signal path of the RF circuitry 306. The baseband circuitry 310 is configured to interface with application circuitry 205 (see FIG. 2) for generation and processing of the baseband signals and for controlling operations of the RF circuitry 306. The baseband circuitry 310 may handle various radio control functions.

The aforementioned circuitry and/or control logic of the baseband circuitry 310 may include one or more single or multi-core processors. For example, the one or more processors may include a WLAN baseband processor 304A, a 4G/LTE baseband processor 304B, a 5G/NR baseband processor 304C, or some other baseband processor(s) 304D for other existing generations or communication protocols, generations or communication protocols in development or to be developed in the future (e.g., future WLAN generations, sixth generation (6G), etc.). In other embodiments, some or all of the functionality of baseband processors 304A-D may be included in modules stored in the memory 304G and executed via a Central Processing Unit (CPU) 304E. In other embodiments, some or all of the functionality of baseband processors 304A-D may be provided as hardware accelerators (e.g., FPGAs, ASICs, etc.) loaded with the appropriate bit streams or logic blocks stored in respective memory cells. In various embodiments, the memory 304G may store program code of a real-time OS (RTOS), which when executed by the CPU 304E (or other baseband processor), is to cause the CPU 304E (or other baseband processor) to manage resources of the baseband circuitry 310, schedule tasks, etc. Examples of the RTOS may include Operating System Embedded (OSE)™ provided by Enea®, Nucleus RTOS™ provided by Mentor Graphics®, Versatile Real-Time Executive (VRTX) provided by Mentor Graphics®, ThreadX™ provided by Express Logic®, FreeRTOS, REX OS provided by Qualcomm®, OKL4 provided by Open Kernel (OK) Labs®, or any other suitable RTOS, such as those discussed herein. In addition, the baseband circuitry 310 includes one or more audio digital signal processor(s) (DSP) 304F. The audio DSP(s) 304F include elements for compression/decompression and echo cancellation and may include other suitable processing elements in other embodiments.

In some embodiments, each of the processors 304A-304E include respective memory interfaces to send/receive data to/from the memory 304G. The baseband circuitry 310 may further include one or more interfaces to communicatively couple to other circuitries/devices, such as an interface to send/receive data to/from memory external to the baseband circuitry 310; an application circuitry interface to send/receive data to/from the application circuitry 205 of FIG. 2); an RF circuitry interface to send/receive data to/from RF circuitry 306 of FIG. 3; a wireless hardware connectivity interface to send/receive data to/from one or more wireless hardware elements (e.g., Near Field Communication (NFC) components, Bluetooth®/Bluetooth® Low Energy components, Wi-Fi® components, and/or the like); and a power management interface to send/receive power or control signals to/from the PMIC 225.

In alternate embodiments (which may be combined with the above described embodiments), baseband circuitry 310 comprises one or more digital baseband systems, which are coupled with one another via an interconnect subsystem and to a CPU subsystem, an audio subsystem, and an interface subsystem. The digital baseband subsystems may also be coupled to a digital baseband interface and a mixed-signal baseband subsystem via another interconnect subsystem. Each of the interconnect subsystems may include a bus system, point-to-point connections, network-on-chip (NOC) structures, and/or some other suitable bus or interconnect technology, such as those discussed herein. The audio subsystem may include DSP circuitry, buffer memory, program memory, speech processing accelerator circuitry, data converter circuitry such as analog-to-digital and digital-to-analog converter circuitry, analog circuitry including one or more of amplifiers and filters, and/or other like components. In an aspect of the present disclosure, baseband circuitry 310 may include protocol processing circuitry with one or more instances of control circuitry (not shown) to provide control functions for the digital baseband circuitry and/or radio frequency circuitry (e.g., the radio front end modules 315).

Although not shown by FIG. 3, in some embodiments, the baseband circuitry 310 includes individual processing device(s) to operate one or more wireless communication protocols (e.g., a "multi-protocol baseband processor" or "protocol processing circuitry") and individual processing device(s) to implement PHY layer functions. In these embodiments, the PHY layer functions include the aforementioned radio control functions. In these embodiments, the protocol processing circuitry operates or implements various protocol layers/entities of one or more wireless communication protocols. In a first example, the protocol processing circuitry may operate one or more IEEE-based protocols when the baseband circuitry 310 and/or RF circuitry 306 are part of a Wi-Fi communication system. In the second example, the protocol processing circuitry would operate Wi-Fi MAC and logical link control (LLC) functions. In a second example, the protocol processing circuitry may operate LTE protocol entities and/or 5G/NR protocol entities when the baseband circuitry 310 and/or RF circuitry 306 are part of mmWave communication circuitry or some other suitable cellular communication circuitry. In the second example, the protocol processing circuitry would operate MAC, RLC, PDCP, SDAP, RRC, and NAS functions. The protocol processing circuitry may include one or more memory structures (e.g., 304G) to store program code and data for operating the protocol functions, as well as one or more processing cores to execute the program code and perform various operations using the data. The baseband circuitry 310 may also support radio communications for more than one wireless protocol. In various embodiments, the protocol processing circuitry may implement the vMACs and/or vPHYs as described herein.

The various hardware elements of the baseband circuitry 310 discussed herein may be implemented, for example, as a solder-down substrate including one or more integrated circuits (ICs), a single packaged IC soldered to a main circuit board or a multi-chip module containing two or more ICs. In one example, the components of the baseband circuitry 310 may be suitably combined in a single chip or chipset, or disposed on a same circuit board. In another example, some or all of the constituent components of the baseband circuitry 310 and RF circuitry 306 may be implemented together such as, for example, a system on a chip (SoC) or System-in-Package (SiP). In another example, some or all of the constituent components of the baseband circuitry 310 may be implemented as a separate SoC that is communicatively coupled with and RF circuitry 306 (or multiple instances of RF circuitry 306). In yet another example, some or all of the constituent components of the baseband circuitry 310 and the application circuitry 205 may be implemented together as individual SoCs mounted to a same circuit board (e.g., a "multi-chip package").

In some embodiments, the baseband circuitry 310 may provide for communication compatible with one or more radio technologies. For example, in some embodiments, the baseband circuitry 310 may support communication with a WLAN, an evolved universal terrestrial radio access network (E-UTRAN) or other wireless metropolitan area network (WMAN), and/or a wireless personal area network (WPAN). Embodiments in which the baseband circuitry 310 is configured to support radio communications of more than one wireless protocol may be referred to as multi-mode baseband circuitry.

RF circuitry 306 may enable communication with wireless networks using modulated electromagnetic radiation through a non-solid medium. In various embodiments, the RF circuitry 306 may include switches, filters, amplifiers, etc. to facilitate the communication with the wireless network. RF circuitry 306 may include a receive signal path, which may include circuitry to down-convert RF signals received from the FEM circuitry 308 and provide baseband signals to the baseband circuitry 310. RF circuitry 306 may also include a transmit signal path, which may include circuitry to up-convert baseband signals provided by the baseband circuitry 310 and provide RF output signals to the FEM circuitry 308 for transmission.

In some embodiments, the receive signal path of the RF circuitry 306 may include mixer circuitry 306a, amplifier circuitry 306b and filter circuitry 306c. In some embodiments, the transmit signal path of the RF circuitry 306 may include filter circuitry 306c and mixer circuitry 306a. RF circuitry 306 may also include synthesizer circuitry 306d for synthesizing a frequency for use by the mixer circuitry 306a of the receive signal path and the transmit signal path. In some embodiments, the mixer circuitry 306a of the receive signal path may be configured to down-convert RF signals received from the FEM circuitry 308 based on the synthesized frequency provided by synthesizer circuitry 306d. The amplifier circuitry 306b may be configured to amplify the down-converted signals and the filter circuitry 306c may be a low-pass filter (LPF) or band-pass filter (BPF) configured to remove unwanted signals from the down-converted signals to generate output baseband signals. Output baseband signals may be provided to the baseband circuitry 310 for further processing. In some embodiments, the output baseband signals may be zero-frequency baseband signals, although this is not a requirement. In some embodiments, mixer circuitry 306a of the receive signal path may comprise passive mixers, although the scope of the embodiments is not limited in this respect.

In some embodiments, the mixer circuitry 306a of the transmit signal path may be configured to up-convert input baseband signals based on the synthesized frequency provided by the synthesizer circuitry 306d to generate RF output signals for the FEM circuitry 308. The baseband signals may be provided by the baseband circuitry 310 and may be filtered by filter circuitry 306c.

In some embodiments, the mixer circuitry 306a of the receive signal path and the mixer circuitry 306a of the transmit signal path may include two or more mixers and may be arranged for quadrature downconversion and upconversion, respectively. In some embodiments, the mixer circuitry 306a of the receive signal path and the mixer circuitry 306a of the transmit signal path may include two or more mixers and may be arranged for image rejection (e.g., Hartley image rejection). In some embodiments, the mixer circuitry 306a of the receive signal path and the mixer circuitry 306a of the transmit signal path may be arranged for direct downconversion and direct upconversion, respectively. In some embodiments, the mixer circuitry 306a of the receive signal path and the mixer circuitry 306a of the transmit signal path may be configured for super-heterodyne operation.

In some embodiments, the output baseband signals and the input baseband signals may be analog baseband signals, although the scope of the embodiments is not limited in this respect. In some alternate embodiments, the output baseband signals and the input baseband signals may be digital baseband signals. In these alternate embodiments, the RF circuitry 306 may include analog-to-digital converter (ADC) and digital-to-analog converter (DAC) circuitry and the baseband circuitry 310 may include a digital baseband interface to communicate with the RF circuitry 306.

In some dual-mode embodiments, a separate radio IC circuitry may be provided for processing signals for each spectrum, although the scope of the embodiments is not limited in this respect.

In some embodiments, the synthesizer circuitry 306d may be a fractional-N synthesizer or a fractional N/N+1 synthesizer, although the scope of the embodiments is not limited in this respect as other types of frequency synthesizers may be suitable. For example, synthesizer circuitry 306d may be a delta-sigma synthesizer, a frequency multiplier, or a synthesizer comprising a phase-locked loop with a frequency divider.

The synthesizer circuitry 306d may be configured to synthesize an output frequency for use by the mixer circuitry 306a of the RF circuitry 306 based on a frequency input and a divider control input. In some embodiments, the synthesizer circuitry 306d may be a fractional N/N+1 synthesizer.

In some embodiments, frequency input may be provided by a voltage controlled oscillator (VCO), although that is not a requirement. Divider control input may be provided by either the baseband circuitry 310 or the application circuitry 205 depending on the desired output frequency. In some embodiments, a divider control input (e.g., N) may be determined from a look-up table based on a channel indicated by the application circuitry 205.

Synthesizer circuitry 306d of the RF circuitry 306 may include a divider, a delay-locked loop (DLL), a multiplexer and a phase accumulator. In some embodiments, the divider may be a dual modulus divider (DMD) and the phase accumulator may be a digital phase accumulator (DPA). In some embodiments, the DMD may be configured to divide the input signal by either N or N+1 (e.g., based on a carry out) to provide a fractional division ratio. In some example embodiments, the DLL may include a set of cascaded, tunable, delay elements, a phase detector, a charge pump and a D-type flip-flop. In these embodiments, the delay elements may be configured to break a VCO period up into Nd equal packets of phase, where Nd is the number of delay elements in the delay line. In this way, the DLL provides negative feedback to help ensure that the total delay through the delay line is one VCO cycle.

In some embodiments, synthesizer circuitry 306d may be configured to generate a carrier frequency as the output frequency, while in other embodiments, the output frequency may be a multiple of the carrier frequency (e.g., twice the carrier frequency, four times the carrier frequency) and used in conjunction with quadrature generator and divider circuitry to generate multiple signals at the carrier frequency with multiple different phases with respect to each other. In some embodiments, the output frequency may be a LO frequency (fLO). In some embodiments, the RF circuitry 306 may include an IQ/polar converter.

FEM circuitry 308 may include a receive signal path, which may include circuitry configured to operate on RF signals received from antenna array 311, amplify the received signals and provide the amplified versions of the received signals to the RF circuitry 306 for further processing. FEM circuitry 308 may also include a transmit signal path, which may include circuitry configured to amplify signals for transmission provided by the RF circuitry 306 for transmission by one or more of antenna elements of antenna array 311. In various embodiments, the amplification through the transmit or receive signal paths may be done solely in the RF circuitry 306, solely in the FEM circuitry 308, or in both the RF circuitry 306 and the FEM circuitry 308.

In some embodiments, the FEM circuitry 308 may include a TX/RX switch to switch between transmit mode and receive mode operation. The FEM circuitry 308 may include a receive signal path and a transmit signal path. The receive signal path of the FEM circuitry 308 may include an LNA to amplify received RF signals and provide the amplified received RF signals as an output (e.g., to the RF circuitry 306). The transmit signal path of the FEM circuitry 308 may include a power amplifier (PA) to amplify input RF signals (e.g., provided by RF circuitry 306), and one or more filters to generate RF signals for subsequent transmission by one or more antenna elements of the antenna array 311.

The antenna array 311 comprises one or more antenna elements, each of which is configured convert electrical signals into radio waves to travel through the air and to convert received radio waves into electrical signals. For example, digital baseband signals provided by the baseband circuitry 310 is converted into analog RF signals (e.g., modulated waveform) that will be amplified and transmitted via the antenna elements of the antenna array 311 including one or more antenna elements (not shown). The antenna elements may be omnidirectional, direction, or a combination thereof. The antenna elements may be formed in a multitude of arranges as are known and/or discussed herein. In some embodiments, the antenna array 311 may comprise metal strip (e.g., slot) antennas that are at least partially formed by a housing of the computing platform (e.g., platform 200). The antenna array 311 may comprise microstrip antennas or printed antennas that are fabricated on the surface of one or more printed circuit boards (e.g., rigid and/or flexible printed circuit boards). The antenna array 311 may be formed in as a patch of metal foil (e.g., a patch antenna) in a variety of shapes, and may be coupled with the RF circuitry 306 and/or FEM circuitry 308 using metal transmission lines or the like.

Figure 4:
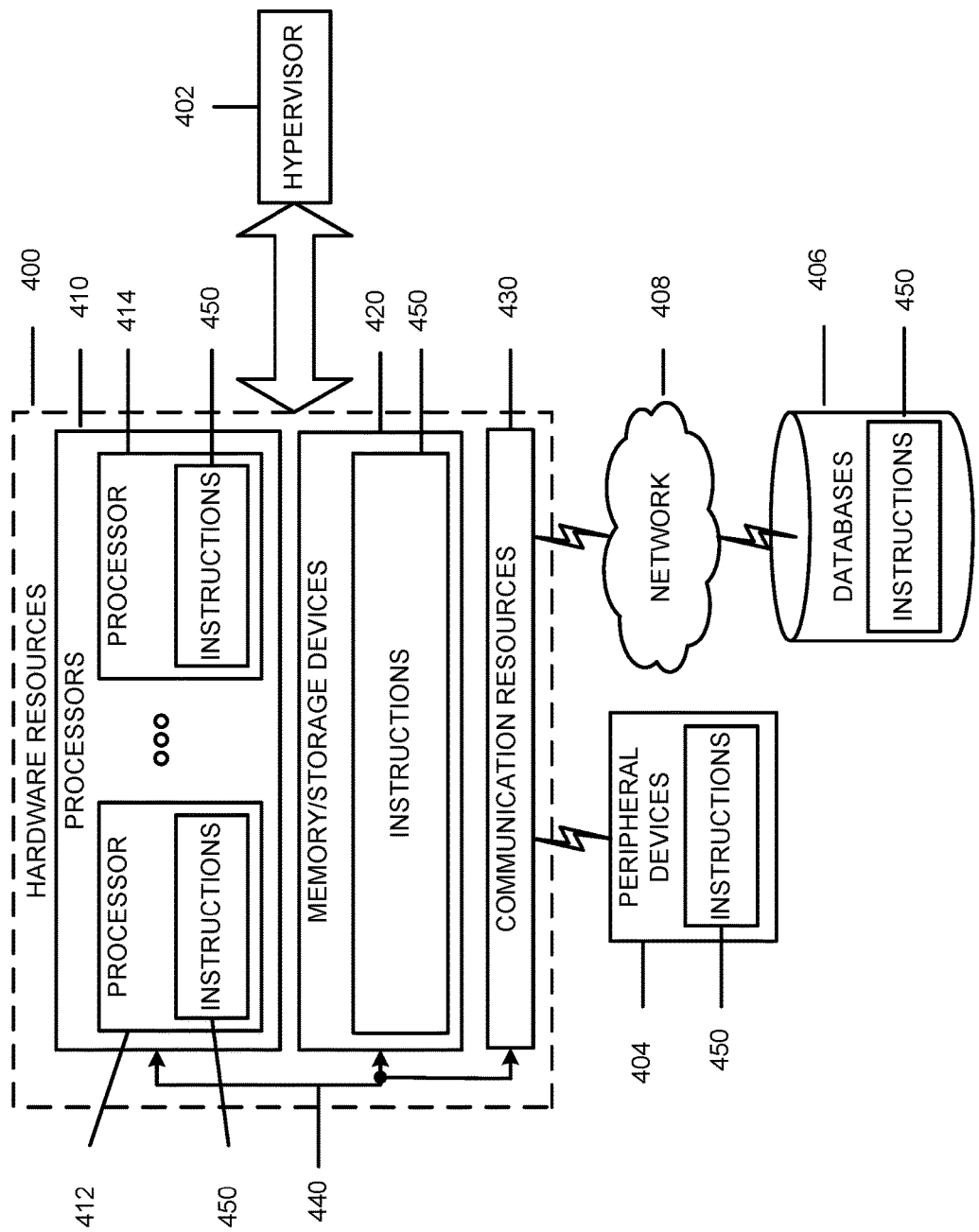
FIG. 4 is a block diagram illustrating components, according to some example embodiments, able to read instructions from a machine-readable or computer-readable medium (for example, a non-transitory machine-readable storage medium) and perform any one or more of the methodologies discussed herein.

FIG. 4 is a block diagram illustrating components, according to some example embodiments, able to read instructions from a machine-readable or computer-readable medium (e.g., a non-transitory machine-readable storage medium) and perform any one or more of the methodologies discussed herein. Specifically, FIG. 4 shows a diagrammatic representation of hardware resources 400 including one or more processors (or processor cores) 410, one or more memory/storage devices 420, and one or more communication resources 430, each of which may be communicatively coupled via a bus 440. As used herein, the term "computing resource", "hardware resource", etc., may refer to a physical or virtual device, a physical or virtual component within a computing environment, and/or physical or virtual component within a particular device, such as computer devices, mechanical devices, memory space, processor/CPU time and/or processor/CPU usage, processor and accelerator loads, hardware time or usage, electrical power, input/output operations, ports or network sockets, channel/link allocation, throughput, memory usage, storage, network, database and applications, and/or the like. For embodiments where node virtualization (e.g., NFV) is utilized, a hypervisor 402 may be executed to provide an execution environment for one or more network slices/sub-slices to utilize the hardware resources 400. A "virtualized resource" may refer to compute, storage, and/or network resources provided by virtualization infrastructure to an application, device, system, etc.

The processors 410 (e.g., a central processing unit (CPU), a reduced instruction set computing (RISC) processor, a complex instruction set computing (CISC) processor, a graphics processing unit (GPU), a digital signal processor (DSP) such as a baseband processor, an application specific integrated circuit (ASIC), a radio-frequency integrated circuit (RFIC), another processor, or any suitable combination thereof) may include, for example, a processor 412 and a processor 414.

The memory/storage devices 420 may include main memory, disk storage, or any suitable combination thereof. The memory/storage devices 420 may include, but are not limited to any type of volatile or non-volatile memory such as dynamic random access memory (DRAM), static random-access memory (SRAM), erasable programmable read-only memory (EPROM), electrically erasable programmable read-only memory (EEPROM), Flash memory, solid-state storage, etc.

The communication resources 430 may include interconnection or network interface components or other suitable devices to communicate with one or more peripheral devices 404 or one or more databases 406 via a network 408. For example, the communication resources 1030 may include wired communication components (e.g., for coupling via a Universal Serial Bus (USB)), cellular communication components, NFC components, Bluetooth® components (e.g., Bluetooth® Low Energy), Wi-Fi® components, and other communication components. As used herein, the term "network resource" or "communication resource" may refer to computing resources that are accessible by computer devices via a communications network. The term "system resources" may refer to any kind of shared entities to provide services, and may include computing and/or network resources. System resources may be considered as a set of coherent functions, network data objects or services, accessible through a server where such system resources reside on a single host or multiple hosts and are clearly identifiable.

Instructions 450 may comprise software, a program, an application, an applet, an app, or other executable code for causing at least any of the processors 410 to perform any one or more of the methodologies discussed herein. For example, the instructions 450 may cause one or more of the processors 410 to determine individual transmit power allocations and MCSs for a multiuser OFDM a downlink transmission as described herein.

The instructions 450 may reside, completely or partially, within at least one of the processors 410 (e.g., within the processor's cache memory), the memory/storage devices 420, or any suitable combination thereof. Furthermore, any portion of the instructions 450 may be transferred to the hardware resources 400 from any combination of the peripheral devices 404 or the databases 406. Accordingly, the memory of processors 410, the memory/storage devices 420, the peripheral devices 404, and the databases 406 are examples of computer-readable and machine-readable media.

Example Procedures

In some embodiments, the electronic device(s), network(s), system(s), chip(s) or component(s), or portions or implementations thereof, of FIGS. 1-4, or some other figure herein, may be configured to perform one or more processes, techniques, or methods as described herein, or portions thereof. One such process is depicted in FIG. 5, which may be performed by a client device in some embodiments. For example, the process 500 may include, at 505, retrieving, from memory, parameters for forming a network with a wireless fidelity (Wi-Fi) device operating in a 5.925-7.125 GHz band. The process further includes, at 510, forming a network with the Wi-Fi device based on the retrieved parameters while the apparatus concurrently operates as a client under control of an indoor access point (AP). The process further includes, at 515, communicating with the indoor AP using an effective isotropic radiated power (EIRP) in excess of 6 dB below an EIRP limit for total power and spectral power density (PD) associated with the indoor AP.

Another such process is illustrated in FIG. 6, which may be performed by a client device in some embodiments. For example, the process 600 includes, at 605, forming a network with a wireless fidelity (Wi-Fi) device while the client device concurrently operates as a client under control of an indoor access point (AP). The process further includes, at 610, communicating with the indoor AP using an effective isotropic radiated power (EIRP) in excess of 6 dB below an EIRP limit for total power and spectral power density (PD) associated with the indoor AP.

Another such process is illustrated in FIG. 7, which may be performed by a client device in some embodiments. In this example, process 700 includes, at 705, determining that a client device has a capability to form a network with a wireless fidelity (Wi-Fi) device while the client device concurrently operates as a client under control of an indoor access point (AP). The process further includes, at 710, in response to determining that the client device has the capability, communicating with the indoor AP using an effective isotropic radiated power (EIRP) in excess of 6 dB below an EIRP limit for total power and spectral power density (PD) associated with the indoor AP.

For one or more embodiments, at least one of the components set forth in one or more of the preceding figures may be configured to perform one or more operations, techniques, processes, and/or methods as set forth in the example section below. For example, the baseband circuitry as described above in connection with one or more of the preceding figures may be configured to operate in accordance with one or more of the examples set forth below. For another example, circuitry associated with a UE, base station, network element, etc. as described above in connection with one or more of the preceding figures may be configured to operate in accordance with one or more of the examples set forth below in the example section.

EXAMPLES

Example 1 includes an apparatus comprising: memory to store parameters for forming a network with a wireless fidelity (Wi-Fi) device operating in a 5.925-7.125 GHz band; and processor circuitry, coupled with the memory, to: retrieve the parameters from the memory; form a network with the Wi-Fi device based on the retrieved parameters while the apparatus concurrently operates as a client under control of an indoor access point (AP); and communicate with the indoor AP using an effective isotropic radiated power (EIRP) in excess of 6 dB below an EIRP limit for total power and spectral power density (PD) associated with the indoor AP.

Example 2 includes the apparatus of example 1 or some other example herein, wherein the formed network includes a wireless local area network (LAN).

Example 3 includes the apparatus of example 1 or some other example herein, wherein the formed network includes a peer-to-peer (P2P) network.

Example 4 includes the apparatus of example 1 or some other example herein, wherein the indoor AP operates in a 5.925-7.125 GHz band, is supplied power from a wired connection, has an integrated antenna or multiple antennas or an antenna array, is not battery powered, and does not have a weatherized enclosure.

Example 5 includes the apparatus of example 1 or some other example herein, wherein the apparatus operates in a 5.925-7.125 GHz band, is supplied power from a wired connection, has an integrated antenna, is not battery powered, and does not have a weatherized enclosure.

Example 6 includes one or more non-transitory computer-readable media storing instructions that, when executed by one or more processors, cause a client device to: form a network with a wireless fidelity (Wi-Fi) device while the client device concurrently operates as a client under control of an indoor access point (AP); and communicate with the indoor AP using an effective isotropic radiated power (EIRP) in excess of 6 dB below an EIRP limit for total power and spectral power density (PD) associated with the indoor AP.

Example 7 includes the one or more non-transitory computer-readable media of example 6 or some other example herein, wherein the formed network includes a wireless local area network (LAN).

Example 8 includes the one or more non-transitory computer-readable media of example 6 or some other example herein, wherein the formed network includes a peer-to-peer (P2P) network.

Example 9 includes the one or more non-transitory computer-readable media of example 6 or some other example herein, wherein the indoor AP operates in a 5.925-7.125 GHz band, is supplied power from a wired connection, has an integrated antenna or multiple antennas or an antenna array, is not battery powered, and does not have a weatherized enclosure.

Example 10 includes the one or more non-transitory computer-readable media of example 6 or some other example herein, wherein the client device operates in a 5.925-7.125 GHz band, is supplied power from a wired connection, has an integrated antenna, is not battery powered, and does not have a weatherized enclosure.

Example 11 includes one or more non-transitory computer-readable media storing instructions that, when executed by one or more processors, are to cause a client device to: determine that the client device has a capability to form a network with a wireless fidelity (Wi-Fi) device while the client device concurrently operates as a client under control of an indoor access point (AP); and in response to determining that the client device has the capability, communicate with the indoor AP using an effective isotropic radiated power (EIRP) in excess of 6 dB below an EIRP limit for total power and spectral power density (PD) associated with the indoor AP.

Example 12 includes the one or more non-transitory computer-readable media of example 11 or some other example herein, wherein the communication with the indoor AP occurs without a network formed with the Wi-Fi device.

Example 13 includes the one or more non-transitory computer-readable media of example 11 or some other example herein, wherein the media further stores instructions to cause the client device to form the network with the Wi-Fi device prior to the communication with the indoor AP.

Example 14 includes the one or more non-transitory computer-readable media of example 13 or some other example herein, wherein the formed network includes a wireless local area network (LAN).

Example 15 includes the one or more non-transitory computer-readable media of example 13 or some other example herein, wherein the formed network includes a peer-to-peer (P2P) network.

Example 16 includes the one or more non-transitory computer-readable media of example 11 or some other example herein, wherein the indoor AP operates in a 5.925-7.125 GHz band, is supplied power from a wired connection, has an integrated antenna or multiple antennas or an antenna array, is not battery powered, and does not have a weatherized enclosure.

Example 17 includes the one or more non-transitory computer-readable media of example 11 or some other example herein, wherein the client device operates in a 5.925-7.125 GHz band, is supplied power from a wired connection, has an integrated antenna, is not battery powered, and does not have a weatherized enclosure.

Example Z01 may include an apparatus comprising means to perform one or more elements of a method described in or related to any of examples 1-17, or any other method or process described herein.

Example Z02 may include one or more non-transitory computer-readable media comprising instructions to cause an electronic device, upon execution of the instructions by one or more processors of the electronic device, to perform one or more elements of a method described in or related to any of examples 1-17, or any other method or process described herein.

Example Z03 may include an apparatus comprising logic, modules, or circuitry to perform one or more elements of a method described in or related to any of examples 1-17, or any other method or process described herein.

Example Z04 may include a method, technique, or process as described in or related to any of examples 1-17, or portions or parts thereof.

Example Z05 may include an apparatus comprising: one or more processors and one or more computer-readable media comprising instructions that, when executed by the one or more processors, cause the one or more processors to perform the method, techniques, or process as described in or related to any of examples 1-17, or portions thereof.

Example Z06 may include a signal as described in or related to any of examples 1-17, or portions or parts thereof.

Example Z07 may include a datagram, packet, frame, segment, protocol data unit (PDU), or message as described in or related to any of examples 1-17, or portions or parts thereof, or otherwise described in the present disclosure.

Example Z08 may include a signal encoded with data as described in or related to any of examples 1-17, or portions or parts thereof, or otherwise described in the present disclosure.

Example Z09 may include a signal encoded with a datagram, packet, frame, segment, protocol data unit (PDU), or message as described in or related to any of examples 1-17, or portions or parts thereof, or otherwise described in the present disclosure.

Example Z10 may include an electromagnetic signal carrying computer-readable instructions, wherein execution of the computer-readable instructions by one or more processors is to cause the one or more processors to perform the method, techniques, or process as described in or related to any of examples 1-17, or portions thereof.

Example Z11 may include a computer program comprising instructions, wherein execution of the program by a processing element is to cause the processing element to carry out the method, techniques, or process as described in or related to any of examples 1-17, or portions thereof.

Example Z12 may include a signal in a wireless network as shown and described herein.

Example Z13 may include a method of communicating in a wireless network as shown and described herein.

Example Z14 may include a system for providing wireless communication as shown and described herein.

Example Z15 may include a device for providing wireless communication as shown and described herein.

Any of the above-described examples may be combined with any other example (or combination of examples), unless explicitly stated otherwise. The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

What is claimed is:

1. An apparatus comprising:
   memory to store parameters for forming a network with a wireless fidelity (Wi-Fi) device operating in a 5.925-7.125 GHz band; and
   processor circuitry, coupled with the memory, to:
   retrieve the parameters from the memory;
   form a network with the Wi-Fi device based on the retrieved parameters while the apparatus concurrently operates as a client under control of an indoor access point (AP); and
   communicate with the indoor AP using an effective isotropic radiated power (EIRP) in excess of 6 dB below an EIRP limit for total power and spectral power density (PD) associated with the indoor AP.

2. The apparatus of claim 1, wherein the formed network includes a wireless local area network (LAN).

3. The apparatus of claim 1, wherein the formed network includes a peer-to-peer (P2P) network.

4. The apparatus of claim 1, wherein the indoor AP operates in a 5.925-7.125 GHz band, is supplied power from a wired connection, has an integrated antenna or multiple antennas or an antenna array, is not battery powered, and does not have a weatherized enclosure.

5. The apparatus of claim 1, wherein the apparatus operates in a 5.925-7.125 GHz band, is supplied power from a wired connection, has an integrated antenna, is not battery powered, and does not have a weatherized enclosure.

6. One or more non-transitory computer-readable media storing instructions that, when executed by one or more processors, cause a client device to:
- form a network with a wireless fidelity (Wi-Fi) device while the client device concurrently operates as a client under control of an indoor access point (AP); and
- communicate with the indoor AP using an effective isotropic radiated power (EIRP) in excess of 6 dB below an EIRP limit for total power and spectral power density (PD) associated with the indoor AP.

7. The one or more non-transitory computer-readable media of claim 6, wherein the formed network includes a wireless local area network (LAN).

8. The one or more non-transitory computer-readable media of claim 6, wherein the formed network includes a peer-to-peer (P2P) network.

9. The one or more non-transitory computer-readable media of claim 6, wherein the indoor AP operates in a 5.925-7.125 GHz band, is supplied power from a wired connection, has an integrated antenna or multiple antennas or an antenna array, is not battery powered, and does not have a weatherized enclosure.

10. The one or more non-transitory computer-readable media of claim 6, wherein the client device operates in a 5.925-7.125 GHz band, is supplied power from a wired connection, has an integrated antenna, is not battery powered, and does not have a weatherized enclosure.

11. One or more non-transitory computer-readable media storing instructions that, when executed by one or more processors, are to cause a client device to:
- determine that the client device has a capability to form a network with a wireless fidelity (Wi-Fi) device while the client device concurrently operates as a client under control of an indoor access point (AP); and
- in response to determining that the client device has the capability, communicate with the indoor AP using an effective isotropic radiated power (EIRP) in excess of 6 dB below an EIRP limit for total power and spectral power density (PD) associated with the indoor AP.

12. The one or more non-transitory computer-readable media of claim 11, wherein the communication with the indoor AP occurs without a network formed with the Wi-Fi device.

13. The one or more non-transitory computer-readable media of claim 11, wherein the media further stores instructions to cause the client device to form the network with the Wi-Fi device prior to the communication with the indoor AP.

14. The one or more non-transitory computer-readable media of claim 13, wherein the formed network includes a wireless local area network (LAN).

15. The one or more non-transitory computer-readable media of claim 13, wherein the formed network includes a peer-to-peer (P2P) network.

16. The one or more non-transitory computer-readable media of claim 11, wherein the indoor AP operates in a 5.925-7.125 GHz band, is supplied power from a wired connection, has an integrated antenna or multiple antennas or an antenna array, is not battery powered, and does not have a weatherized enclosure.

17. The one or more non-transitory computer-readable media of claim 11, wherein the client device operates in a 5.925-7.125 GHz band, is supplied power from a wired connection, has an integrated antenna, is not battery powered, and does not have a weatherized enclosure.

* * * * *